United States Patent [19]

Maeshima

[11] Patent Number: 4,734,782

[45] Date of Patent: Mar. 29, 1988

[54] IMAGE PROCESSING APPARATUS OR SYSTEM WITH PLURAL READING UNITS, CAPABLE OF DIFFERENTLY PROCESSING VARIOUS AREAS OF AN ORIGINAL

[75] Inventor: Katsuyoshi Maeshima, Tokyo, Japan

[73] Assignee: Canon Kabushiki Kaisha, Tokyo, Japan

[21] Appl. No.: 931,014

[22] Filed: Nov. 17, 1986

Related U.S. Application Data

[63] Continuation of Ser. No. 598,167, Apr. 9, 1984, abandoned.

[30] Foreign Application Priority Data

Apr. 12, 1983 [JP] Japan ............................... 58-63855
Apr. 12, 1983 [JP] Japan ............................... 58-63856

[51] Int. Cl.⁴ ........................ H04N 1/40; H04N 1/10
[52] U.S. Cl. ............................... 358/280; 358/283; 358/293
[58] Field of Search .............. 358/280, 283, 284, 293, 358/294, 296

[56] References Cited

U.S. PATENT DOCUMENTS

| | | | |
|---|---|---|---|
| 3,961,132 | 6/1976 | Landsman | 358/283 |
| 4,258,393 | 3/1981 | Gjiri et al. | 358/283 |
| 4,325,086 | 4/1982 | Sato et al. | 358/296 |
| 4,349,846 | 9/1982 | Sekejawa | 358/283 |
| 4,459,619 | 7/1984 | Yoshida | 358/293 |
| 4,485,408 | 11/1984 | Kamizyo et al. | 358/283 |
| 4,495,522 | 1/1985 | Matsunawa et al. | 358/283 |
| 4,553,172 | 11/1985 | Yamada et al. | 358/280 |
| 4,553,173 | 11/1985 | Kawamura | 358/283 |

Primary Examiner—Howard W. Britton
Assistant Examiner—John K. Peng
Attorney, Agent, or Firm—Fitzpatrick, Cella, Harper & Scinto

[57] ABSTRACT

An image processing apparatus or system with enhanced half tone expression in a reproduced image and capable of preventing deterioration in reproducibility of characters and letters to be reproduced, which is constructed with an image signal input unit, half a tone expressing unit for processing the input image signal from the image signal input unit and expressing a plurality of half tones on the basis of dither patterns, and a unit for further processing of the half tones with respect to each of the outputs from the half tone expressing means, and forming half tone outputs. Recording signals having different respective pulse widths corresponding respectively to respective plural dither process units may be output, such plural dither process units serving to provide continuity of dither processing at a junction of line sensors or the like.

12 Claims, 16 Drawing Figures

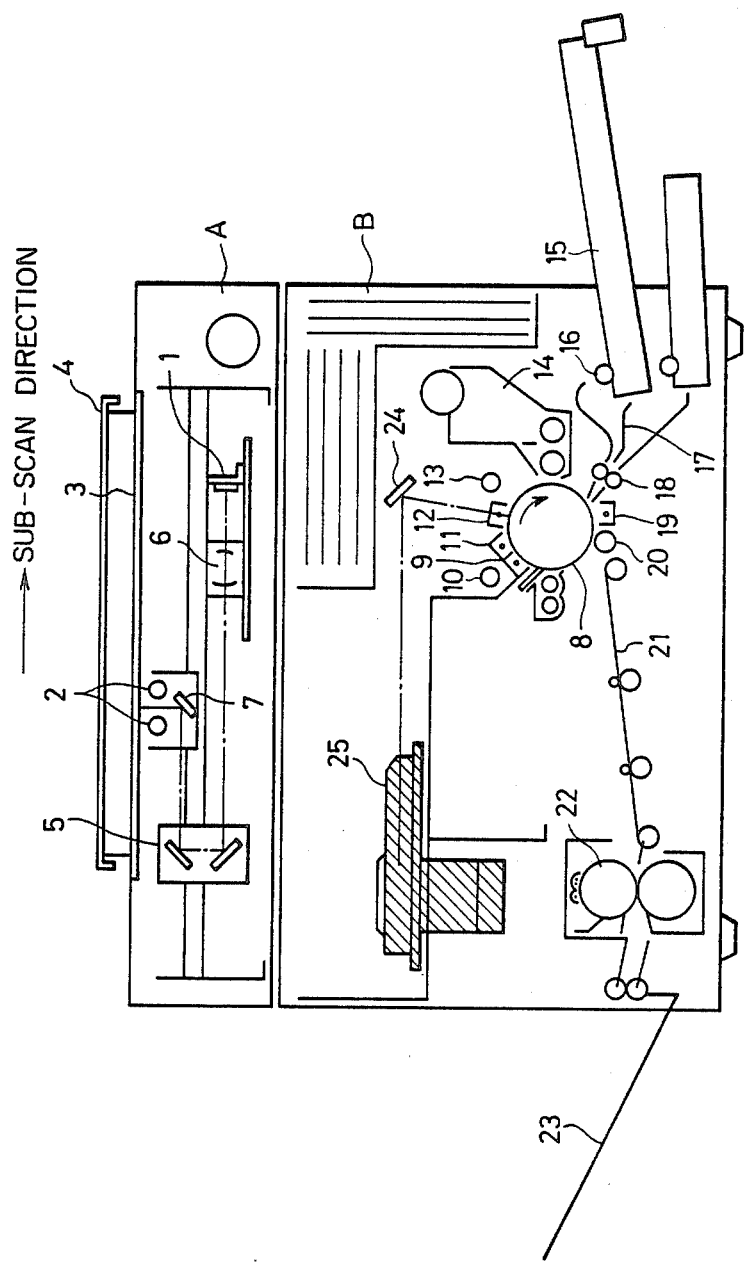

FIG. 6
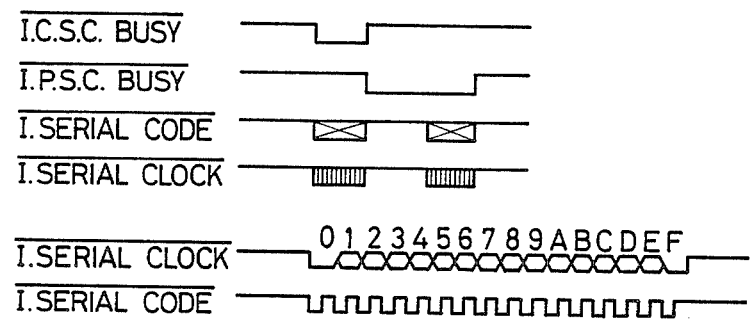
FIG. 7
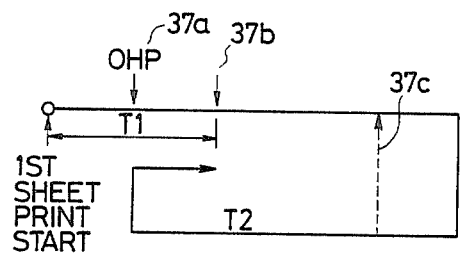
FIG. 10
| A | B | | | | | | |
|---|---|---|---|---|---|---|---|
| 31 | 22 | 14 | 15 | 16 | 17 | 23 | 28 |
| 27 | 13 | 05 | 00 | 01 | 06 | 18 | 24 |
| 26 | 12 | 04 | 03 | 02 | 07 | 19 | 25 |
| 30 | 21 | 11 | 10 | 09 | 08 | 20 | 29 |

IMAGE PROCESSING APPARATUS OR SYSTEM WITH PLURAL READING UNITS, CAPABLE OF DIFFERENTLY PROCESSING VARIOUS AREAS OF AN ORIGINAL

This application is a continuation of application Ser. No. 598,167, filed Apr. 9, 1984, now abandoned.

BACKGROUND OF THE INVENTION

1. Field of the Invention

This invention relates to an image processing apparatus or system such as a reproduction apparatus, facsimile, and so on.

2. Description of Prior Art

Heretofore, in a reproduction apparatus (throughout the specification it is referred to as a "digital copying machine") which reads an image original by means of a photo-electric transducing element (e.g., a charge-coupled device (CCD)), converts the signal as a read into digital signals, and forms the image for reproduction on a printing device, there has generally been adopted binary expression. This conventional system is to determine picture elements as read out in terms of a threshold value of whether they are black or white, based on which determination, image reproduction is effected on the printing device in the form of black or white dots.

According to this image processing system, density of the half tone level (for example, gray, etc.) is expressed in white or black. Therefore, when a copy is to be made from an image original such as photograph containing various half tones, the resulting copy shows dry and monotonous image quality, i.e., the reproduced image differs in quality from the original photograph.

As a method for solving such problem, there has been used a dither method which is to reproduce half tones by properly selecting the number of dots to be reproduced in a certain definite area. While this method is effective in reproduction of an image containing many half tones such as a silver-salt photograph, etc., when the gradation expression is enhanced (i.e., when 64 gradations, for example, are to be expressed, an area containing 8 dots×8 dots is required, and, when 16 gradations are to be reproduced, an area containing therein 4 dots×4 dots is necessary), the image quality appears to be very coarse and rough, even though light and shade may come out in the reproduced image. Further, when the gradation is enhanced, reproducibility of thin lines becomes poor. As the consequence of this, there has inevitably taken place the phenomenon such that, in the case of an image original containing letters and characters besides other forms of image, when the reproducibility of these letters and characters is to be increased, the reproducibility of the half tone image becomes poor, and, on the contrary, when reproducibility of the half tone image is to be enhanced, the reproducibility of the characters and letters becomes deteriorated.

There has also been another image processing method, wherein a plurality of CCD are used to read out an image original, and the data as read out are converted into electrical signals. The present inventors have so far proposed a junction (or connection) compensation among the bits relative to automatic connection of the CCD's in the main scanning direction, by placing a marker, or other reference means at an area outside the image original.

In the case of the half tone expression, when the above-mentioned dither method is employed, disturbance takes place in the dither pattern with the simple connection among the bits, whereby unnaturalness occurs in the gradation of the reproduced image at the junction portion. That is to say, the dither method is to express gradations in one brightness by means of an area containing 2×2 bits, 4×4 bits, 8×8 bits, etc., on account of which, where there is a place in the image original in which a subsequent pattern appears before the preceding pattern comes to an end, such junction portion cannot be reproduced with accurate gradation expression, and the resulting image is distorted or degraded in quality.

It has also been practiced heretofore that the dither patterns are permanently stored in the read-only-memory (ROM), from which image data are read out, and the data signals as read out are compared with image signals to thereby obtain binary signals. With this method, however, when it is desired to vary the dither patterns to decrease variations in the reproduction characteristics in light and shade of the image, waste in such reproduced image, pattern data are required to be stored in the ROM for the number of the dither patterns with the consequence that the capacity of the ROM increases. For high speed processing of the read-out data for one line of 55 ns or higher, a bipolar ROM becomes necessary. Consequently, increase in the ROM capacity inevitably leads to increase in the power consumption and the memory cost with the consequence that the patterns to be stored in the ROM should be limited to the minimum necessary, which causes inconvenience in the actual reproduction operations.

SUMMARY OF THE INVENTION

It is therefore an object of the present invention to provide an improved image processing apparatus or system free from the above-described disadvantages inherent in the conventional apparatuses, being capable of enhancing the half tone expression, and preventing deterioration in reproducibility of characters and letters.

It is another object of the present invention to provide an image processing apparatus or system which is able to increase the quality of the half tone reproduction.

It is still another object of the present invention to provide an image processing apparatus or system which is able to increase freedom in half tone reproduction at a low cost.

It is yet another object of the present invention to provide an image processing apparatus or system which is able to enhance the gradations in the half tones of an image without impairing the image resolution.

It is another object of the present invention to provide an image processing apparatus or system which is able to binarize one picture element as read out in accordance with a dither pattern, and to effect beam width modulation of the laser beam for the printer by imparting to the binarized data a pulse width modulation and taking out modulated signals as an output, thereby giving gradations to a single dot, such as level "1", "0.5", "0", and so forth.

It is still another object of the present invention to provide an image processing apparatus or system of such a construction that the above-mentioned multi-value quantization can be effected partially.

It is yet another object of the present invention to provide an image processing apparatus or system which is capable of effecting accurate expression of half tones irrespective of connection of a plurality of original image reading means.

It is a further object of the present invention to provide an image processing apparatus or system which has reduced unnaturalness in the reproduction of the gradations, and is capable of controlling reading, etc., from the gradation expressing means such as dither memory, etc., in correspondence to the junction portion.

It is still a further object of the present invention to provide an image processing apparatus or system which is capable of setting and controlling the initial value of a counter to address the dither memory.

It is yet a further object of the present invention to provide an image processing apparatus or system which makes it possible to store a multitude of dither patterns with a small number of memories.

The foregoing objects and other objects, as well as specific construction and functions of the image processing apparatus or system according to the present invention, will become more apparent and understandable from the following detailed description thereof, when read in conjunction with the accompanying drawing illustrating preferred embodiments of the invention.

BRIEF DESCRIPTION OF THE DRAWINGS

FIG. 2 is a longitudinal cross-sectional view of the image processing apparatus shown in FIG. 1;

FIGS. 5, 6 and 7 are operational time charts of the circuit shown in FIG. 4;

FIGS. 9-1 and 9-2 are block diagrams showing a quantization circuit for input image signals from CCD;

FIG. 10 is a dither ROM pattern diagram;

FIGS. 112a, 12b, 12c and 12d are schematic block diagrams illustrating the method of CCD junction compensation.

DETAILED DESCRIPTION OF THE PREFERRED EMBODIMENTS

Figure 1:
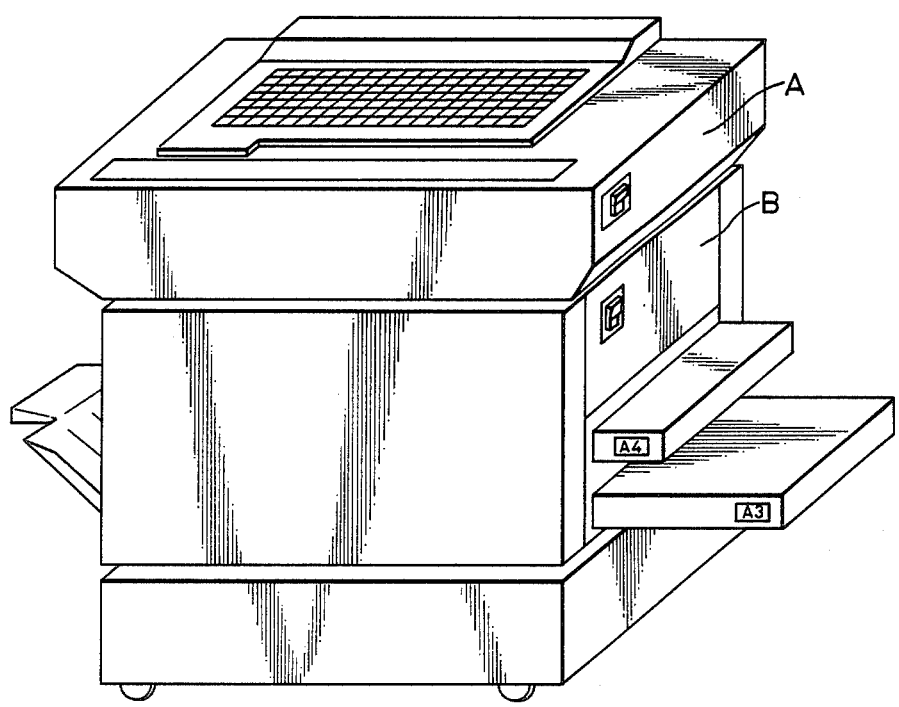
FIG. 1 is a perspective view of an image processing apparatus, to which the present invention is applicable.

FIG. 1 shows an external view of a copying apparatus embodying the present invention, basically consisting of two units, namely a reader A and a printer B, which are functionally and mechanically separated each other and can be used independently. These units are mutually connected through an electric cable. The reader B is equipped with an operation unit A-1 to be explained in detail later.

Figures 1, 9:
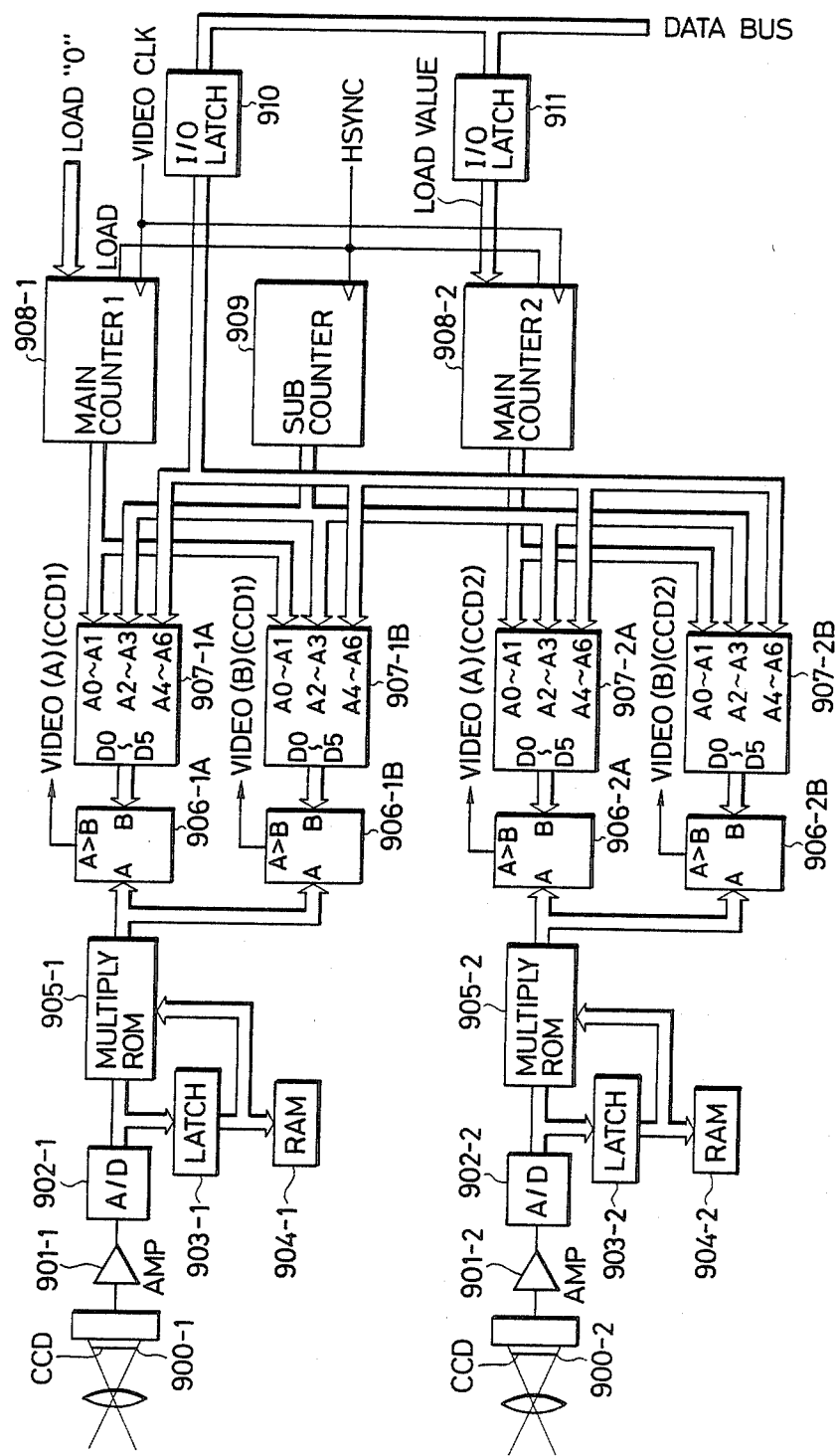
Figures 2, 9:
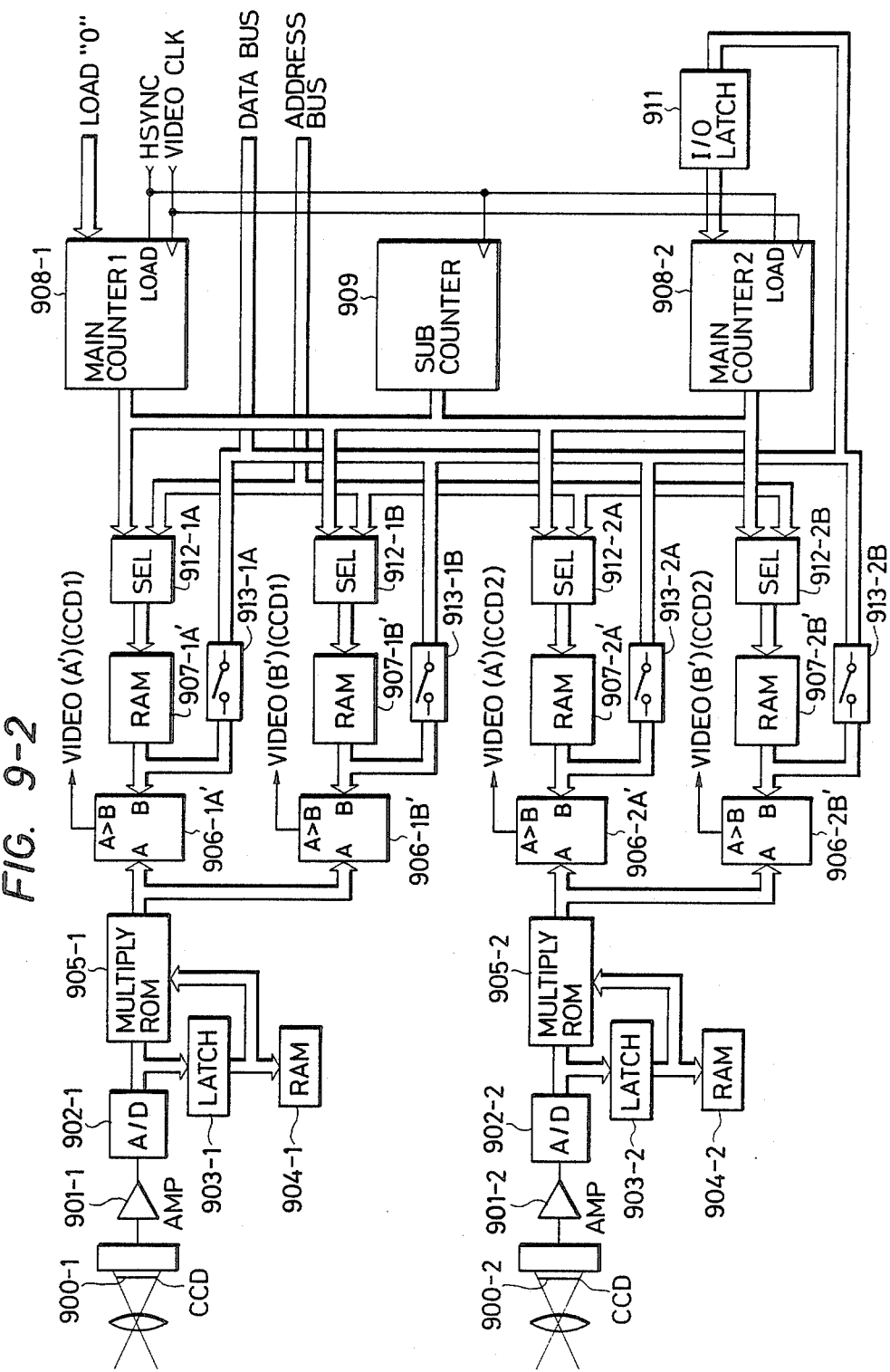

FIG. 2 shows a cross-sectional view of the reader A and the reader B. An image original is placed, with the front face thereof downwards, on an original supporting glass plate 3, at the left rear corner thereof, and is pressed against said glass plate by an original cover 4. The original is illuminated by a fluorescent lamp 2, and an optical path is formed to guide the reflected light onto a charge-coupled device CCD1 through mirrors 5, 7 and a lens 6, wherein the mirrors 7 and 5 are moved with a speed ratio of 2:1. The above-described optical unit moves from left to right at a constant speed by a DC servo motor. The moving speed of the optical unit is 180 mm/sec in its forward movement, when the image original is illuminated, and 468 mm/sec in its backward movement. The resolving power in this subsidiary scanning direction is 16 lines/mm. The processable original size ranges from A3 to A5. An original of A5, B5 or A4 size is placed in a vertically long orientation, while an original of B4 or A3 size is placed in a laterally long orientation. The optical unit is reversed at three points according to the original size. The first point is set at 220 mm away from an original reference position for A5, B5 and A4 size in common, the second point is at 364 mm away from the reference position for B4 size, and the third point is at 431.8 mm for A3 size.

The main scanning width is 297 mm which is equal to the width of an A4-sized original placed in a laterally long orientation. In order to attain a resolving power of 16 pels/mm, there are required 4752 ($=297\times 16$) bits, which are provided, in the present embodiment, by two 2628-bit CCD array sensors (connected in series) to be driven in parallel (simultaneous scanning). Consequently, under the conditions of 16 lines/mm and 180 mm/sec, the main scanning period (or the charge accumulating time of CCD) is equal to $T=1/vn=1/180\times 16=347.2$ microseconds, and the transfer rate of CCD is equal to $f=N/T=2628/347.2=7.569$ MHz.

Now, there will be explained the printer B provided under the reader A in FIG. 2. Bit-serial video signals processed in the reader A are supplied to a laser scanning optical unit 25 in the printer. The unit comprises a semiconductor laser, a collimator lens, a rotary polygonal mirror, an F-$\theta$ lens, and a tilt image correcting optical system. The image signals from the reader are supplied to the semiconductor laser for electro-optical conversion, and the emitted light is rendered a parallel beam by the collimator lens and directed to the polygonal mirror rotating at a high speed for scanning a photosensitive member 8 with the laser beam. The polygonal mirror is rotated at a speed of 2,600 rpm and covers a scanning width of ca. 400 mm, with an effective scanning width of 297 mm equal to the length of the A4 size. The signal frequency supplied to the semiconductor laser is about 20 MHz (when a three-quantized value is output). The laser beam from this unit is impinged on the photosensitive member 8 through a mirror 24.

The photosensitive member 8 has, for example, a three-layered structure consisting of an electrically conductive layer, a photosensitive layer, and an insulating layer. It is provided with process components for image formation, including a preliminary charge remover 9, a preliminary charge removing lamp 10, a primary charger 11, a secondary charger 12, an overall surface exposure lamp 13, a developing unit 14, a paper cassette 15, a paper-feeding roller 16, a paper guide 17, a registration roller 18, an image transfer charger 19, a separating roller 20, a transport guide 21, an image fixing unit 22 and a tray 23. The speed of the photosensitive member 8 and of the transport system is 180 mm/sec, which is same as the scanning speed of the reader. Consequently, the copying speed, when the copying is done by combination of the reader and the printer, is 30 sheets min. for A4-size paper.

The printer uses a separating belt provided at the front side of the drum for separating the copy sheet held on the photosensitive drum, on account of which the image falls short of its scope for the width of the belt. If the image signals are given to the area corresponding to the belt width, and developed, the toner will be deposited on the belt and will stain the subsequent copy sheet. Therefore, the reader unit is so constructed that the video-electrical signals for the printing output may be eliminated from the 8 mm wide area corresponding to the separating belt. Similarly, the signals are eliminated in the reader unit so that no toner may adhere to the leading edge part of the copy sheet for a width of 2 mm, since the toner adhering to the leading edge part will cause the sheet to wind around the image fixing roller in the fixing unit, thus bringing about a sheet jam.

The copying apparatus of the present embodiment has certain intelligent functions such as image editing, etc., which are achieved by processing, in the reader unit, of the signals read into the CCD's. The signals supplied from the reader unit always have a certain definite bit number (4752 bits) and are produced at a constant rate (13.89 MHz) in any operating mode, when they are output from the reader. The intelligent performance includes an arbitrary magnification in a range of from 0.5 to 2.0 times as large as the image original; magnification or reduction with a particular ratio; image trimming function for extracting a designated area of the image; and image moving function for moving the thus trimmed image to an arbitrary position on the copy sheet. Besides these, there is half tone processing function with 32 gradations by appropriate key operation. These individual intelligent functions may be combined into composite functions.

Now there will be explained the functions of the apparatus of the present embodiment. In addition to its simple copying function, the apparatus has image size modifying function for arbitrary image magnification or reduction; an editing function for extracting or deleting an arbitrary portion of the original; a function of automatically detecting the size and position of the original and automatically modifying the image size and editing the image, etc. Such functions of controlling the original image are collectively termed "image control functions". Besides, the apparatus is not only able to simply make a copy of an original image read in by the reader connected to the printer, but also to transmit the original image to other printers through a communication control unit (CCU). It can also receive original images transmitted from other readers. Such functions are collectively termed "image transmission functions". Furthermore, any of the functions selected from the above-mentioned may be arbitrarily registered by means of six preset keys. The contents of such registration can be arbitrarily designated by a user, and be retained even when the power supply is interrupted. Such functions are termed "preset functions". Furthermore, the present apparatus has an automatic exposure function for eliminating the background color of the original, and an intermediate tone processing function for faithfully reproducing gradations in the original image such as photograph. These functions are collectively termed "image quality processing functions".

In summary, the "image control functions" include following five functions:

(1) image size modifying functions, which include equal (or life) size copying (scale of 100%), definite copy size modifications (at designated copy sizes), stepless copy size modifications (scale designation of from 50% to 200%), and X - Y copy size modifications (scale being independently variable in the main and subsidiary scanning directions);

(2) image reversing functions, which include reproduction of the original image, and production of a positive-negative reversal image;

(3) editing functions, which include production of an image either without editing or with white or black masking. In the latter two cases, X - Y size modification mode is automatically effected, and no other image size modifying functions can be designated. There are also white or black frame trimming, and automatic original image position detection, with which are linked the functions of size modification, image reversing, image shifting, and special size modification;

(4) image shifting functions, which include production of an image without shifting, designation of a destination of shifting, movement of the point of origin (cornering), and centering; and (5) special image size modifying functions, which include production of an image either without any special image size modification, or with automatic size modification, or with automatic X - Y size modification. In the latter two cases, no other size modifying functions can be designated at the same time.

It should be noted that the image shifting functions and the special size modifying functions become effective only when the white or black frame trimming mode or automatic original image position detection mode is selected in the editing functions.

The "image transmission functions" include local (ordinary) copying mode, transmission mode (for transmitting the original image to another printer through CCU), and reception mode (for receiving the original image from another reader through CCU).

The "preset functions" include registration (for storing editing data, etc., with preset keys), read-out (for reading the stored data with preset keys), and resetting (for returning all the functions to the standard mode).

The "image quality processing functions" include an automatic exposure mode (AE) and an intermediate tone processing mode.

Figure 3:
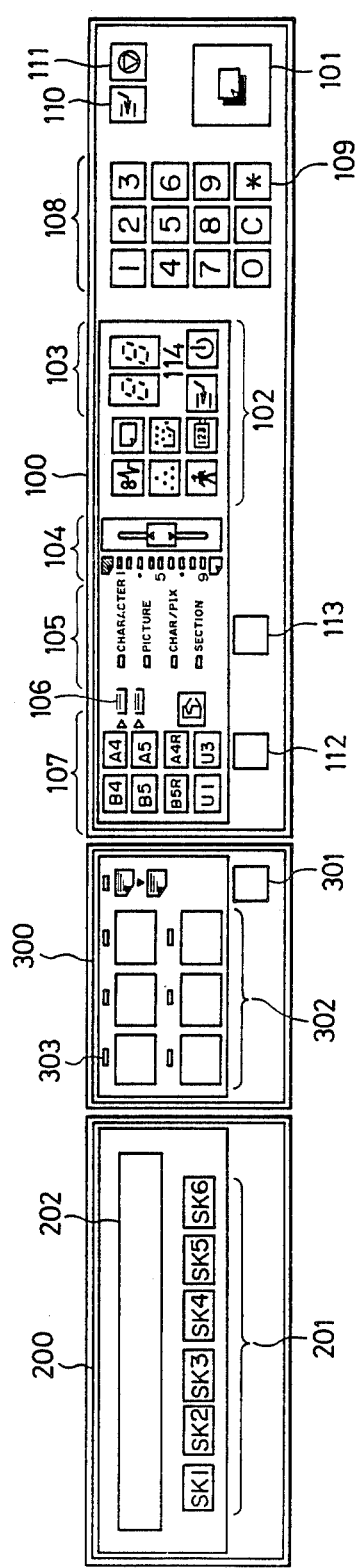
FIG. 3 is a plan view showing an operating unit of the image processing apparatus according to the present invention.

FIG. 3 shows the details of the operation unit A-1 shown in FIG. 1. The unit is composed of three major blocks: a right-hand block 100 including general keys and displays already known in conventional copying machines; a central block 300 including function keys and displays for recalling the copying-transmitting functions which were arbitrarily prepared and stored by the operator in advance in accordance with programs; and a left block 200 including program keys and displays for arbitrarily creating the copying-transmitting functions by the operator. The general key-display block 100 is provided with 7-segment LED display units 103 for indicating the desired copy number as set and the copy count during operation; alarm indicators 102 for indicating sheet jamming, lack of toner, lack of paper, interruption copy mode, etc., as already used in conventional copying machines; a copy density adjusting lever and a corresponding density indicator 104; original image selectors 105 for indicating whether the original image contains characters only, photograph only, characters and photographs in combination, or an image drawn on section paper, these indicators and selectors (102–105) being provided to effect different image processing so as to enable the optimum copy to be made from these four different kinds of original image; an indicator 106 for indicating whether the upper or the lower cassette has been selected; an indicator 107 for indicating the size of the sheet stored in the selected cassette; numeral keys 108 for entering the number of copy sheet into the display unit 103 or for entering numerical values in the course of programming in the program key-display block 200 (for example, designation of trimming coordinates, image moving coordinates, image size varying ratio, transmission address, setting of dither pattern, etc.); an entry key 109 for confirming the key entry made into the block 200; an interruption key 110 for interrupting a multiple copying operation to permit another multiple copying operation to start; a copy cancel key 111 for interrupting the multiple copying operation in the printer or interruption signal reception; a copy key 101 for starting the copying operation in the printer or starting the signal transmission; an original image change-over key 113 connected with the indicator 105; and cassette change-over key 112, the last two keys 113, 112 shifting the display upwards one by one at each actuation. The function key-display block 300 is provided with six functions 302 for registering six different functions, wherein each of said keys is provided with a detachable top for enabling the operator to inscribe a title for the registered function. When a function is created by the operator through the program key-display block 200, a display unit 202 thereof displays a message whether or not to register said function. When, in response to the actuation of a program key 201, six indicators 303 of the block 300 corresponding to said six program keys start to flicker, indicating an enquiry from the apparatus: "In which key should the aforementioned function be registered?" Upon actuation of either key, the corresponding indicator is lighted, while other indicators are extinguished. The operator then detaches the cover, inscribes the title of the function on the key and mounts the cover again. Thereafter, the registered data are retained even when the power supply is cut off, since the memory is backed up by a battery. A key 301 is used for returning to the standard mode.

An indicator 114 is lighted when the interruption key 110 is actuated, and flickers in the reception mode to indicate the reception of image signals from another station and to prohibit the copying operation by the copy key 101. During the reception mode, the data setting and registration through the blocks 200, 300 are enabled. Thus, after or during the reception mode, in response to the actuation of the copy key 101, the liquid crystal display unit 202 displays the content of received data, namely the address of the sending station, total number of received copies, and copy count in operation. Upon acutation of the clear key C, the display is replaced by a display of standard mode or of data set prior to the actuation of the copy key 101. In response to the actuation of the cancel key 111 during the reception of multiple copies, the sheet feeding is terminated and the printing operation is interrupted after the copying cycles are completed for the sheets already present in the transport path. Also a message of such interruption is displayed on a liquid crystal display unit of the sending station.

Now there will be given detailed explanations on the reader unit, while making reference to a block diagram shown in FIG. 4, including interface signals at right. The connector JR1 of the reader is connected to the connector JP1 of the printer for making connection between the two. For additionally achieving external communication, the signals to be supplied from the connector JR1 to the connector JP1 are once supplied instead to the connector JC1 of CCU and transmitted from the connector JC1' of CCU to the connector JP1.

Figure 5:
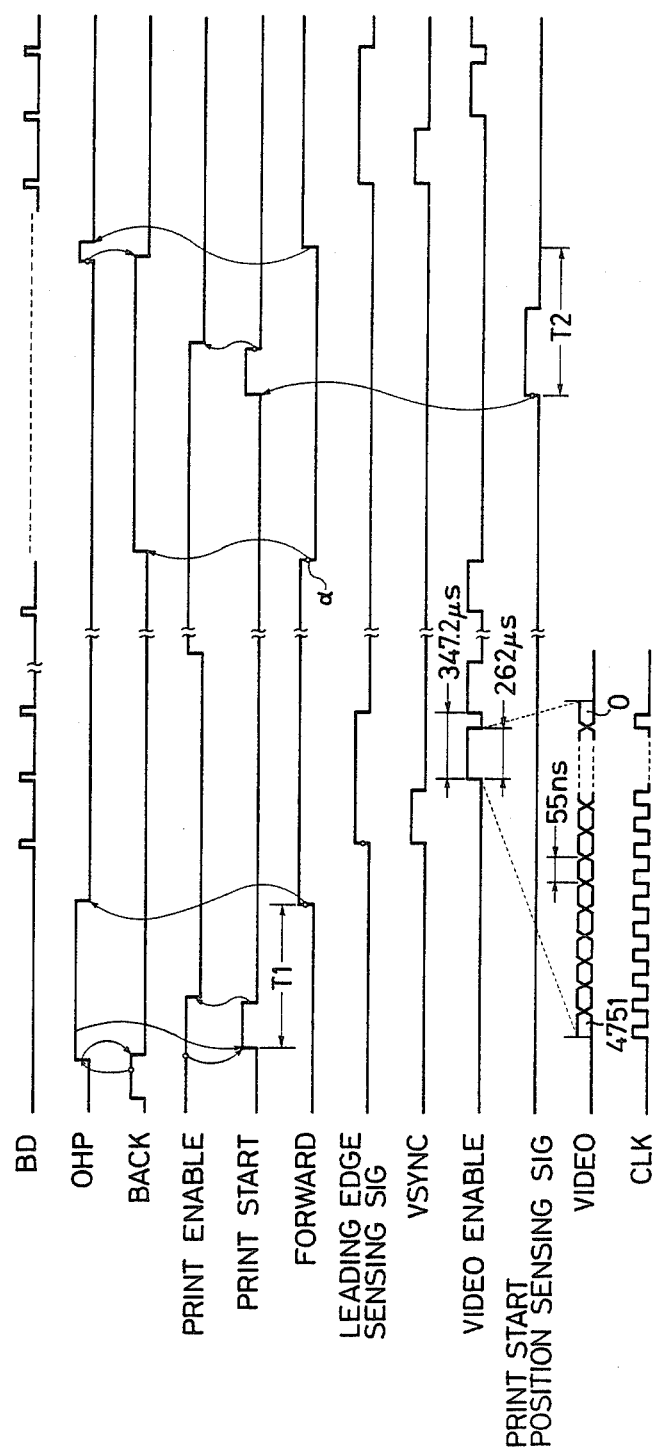

Separately, the connectors JR2 and JC2 are mutually connected for transmitting protocol signals. Interface signals through JR1 have timings as shown in FIGS. 5 and 6. A beam detect signal BD, corresponding to the front end signal of each line, is used for synchronizing the scanner when the printer is connected with the reader. Image signals VIDEO CLK are released at a rate of 4752 bits per line with a duration of 55 ns per pixel, wherein each pixel is capable of representing three states of "0", "½" and "1" according to the image density. More specifically, a state "0" represents an L-level state for a duration of 55 ns, "½" an H-level state for 27.5 ns followed by an L-level state for 27.5 ns, and "1" an H-level state for 55 ns. The signals are produced either in synchronism with the beam detect signal when the printer is connected, or in synchronism with a false signal generated by an internal oscillator in other cases (for example, in the transmission to another station). A signal VIDEO ENABLE is produced during the output of 4752 bits of the image signals, in synchronism with either the beam detect signal or the internally generated false signal. A signal VSYNC, indicating the start of image signals, is released in synchronism with the output signal from an image front end detection sensor 37b and the beam detect signal or the internally generated false signal, and has a duration the same as that of the VIDEO ENABLE signal. A signal PRINT START instructs the start of sheet feeding to the side of the printer. The interval between the signals PRINT START and VSYNC is determined by a control circuit in consideration of the image size varying ratio and the image trimming area. A signal PRINT END, indicating completion of the copying operation in the printer, is a response signal from the printer side and is released when the rear end of a copy sheet leaves the photosensitive drum and is placed on the conveyor belt. This signal indicates the completion of separation of the copy sheet, and is released at a timing in the control sequence. A signal ABX CONNECT indicates connection of a communication interface module, whereupon the corresponding terminal in the module is grounded to enable the communication. A signal PRINTER CONNECT is released when the printer is connected. In the printer, the corresponding terminal is grounded, whereby the printing operation is enabled.

Figure 8:
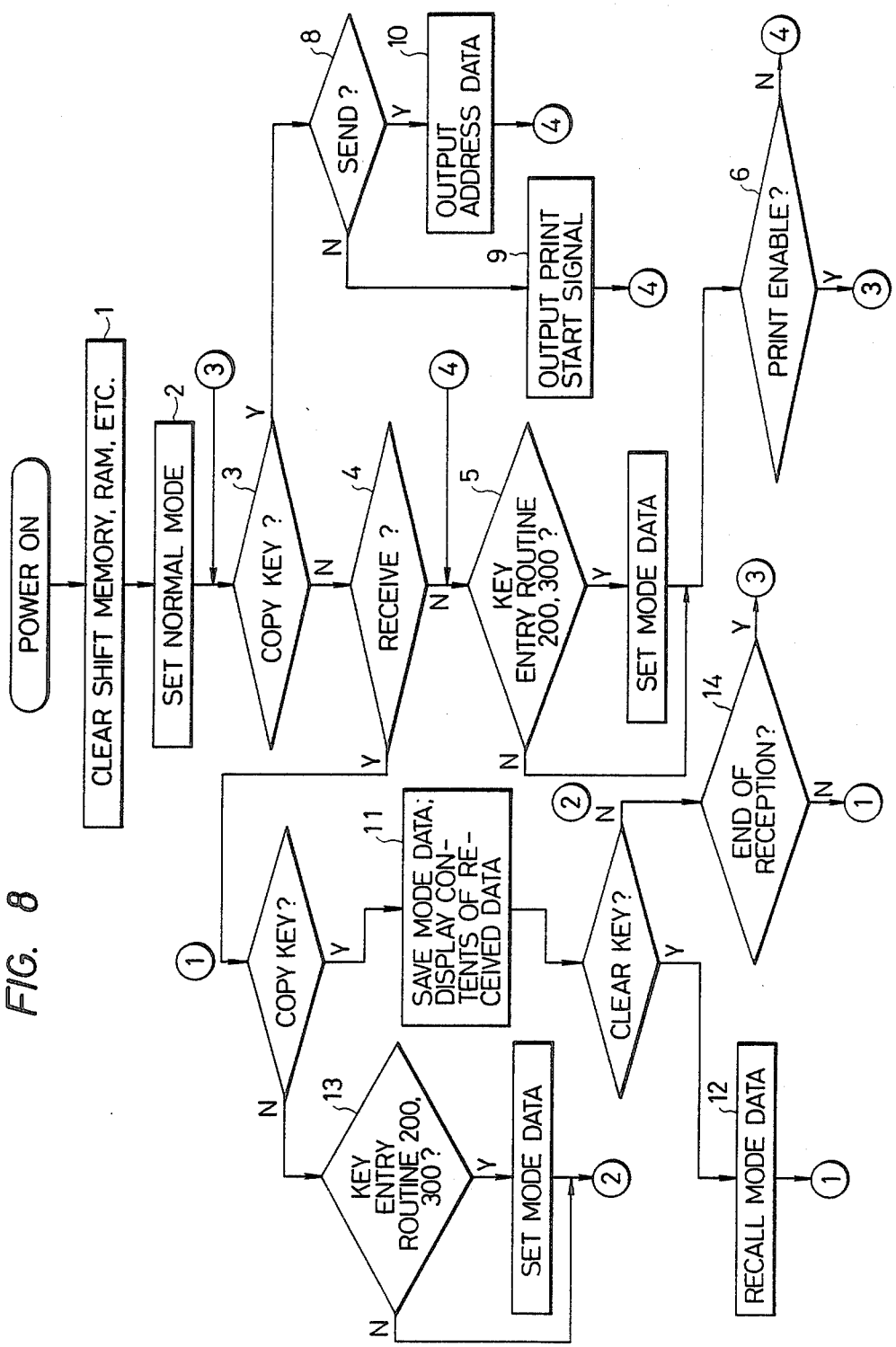
FIG. 8 is a flow chart of operations of the circuit.

Serial signal lines S. DATA, S. CLK, CSC BUSY, PSC BUSY are used for protocol exchange between the reader and the printer (for exchanging information between them such as permission, signalling, etc. of transmission). S. DATA and S. CLK are respectively protocol data and clock signals, both 16-bits and bidirectional. The signal CSC BUSY is released when the reader releases the data and clock signals, and the signal PSC BUSY is released when the printer releases the data and clock signals. Consequently, these signals indicate the direction of transmission of the signals S. DATA and S. CLK. Reference should be made to FIG. 8 for the detailed timings of these signals.

Figure 4:
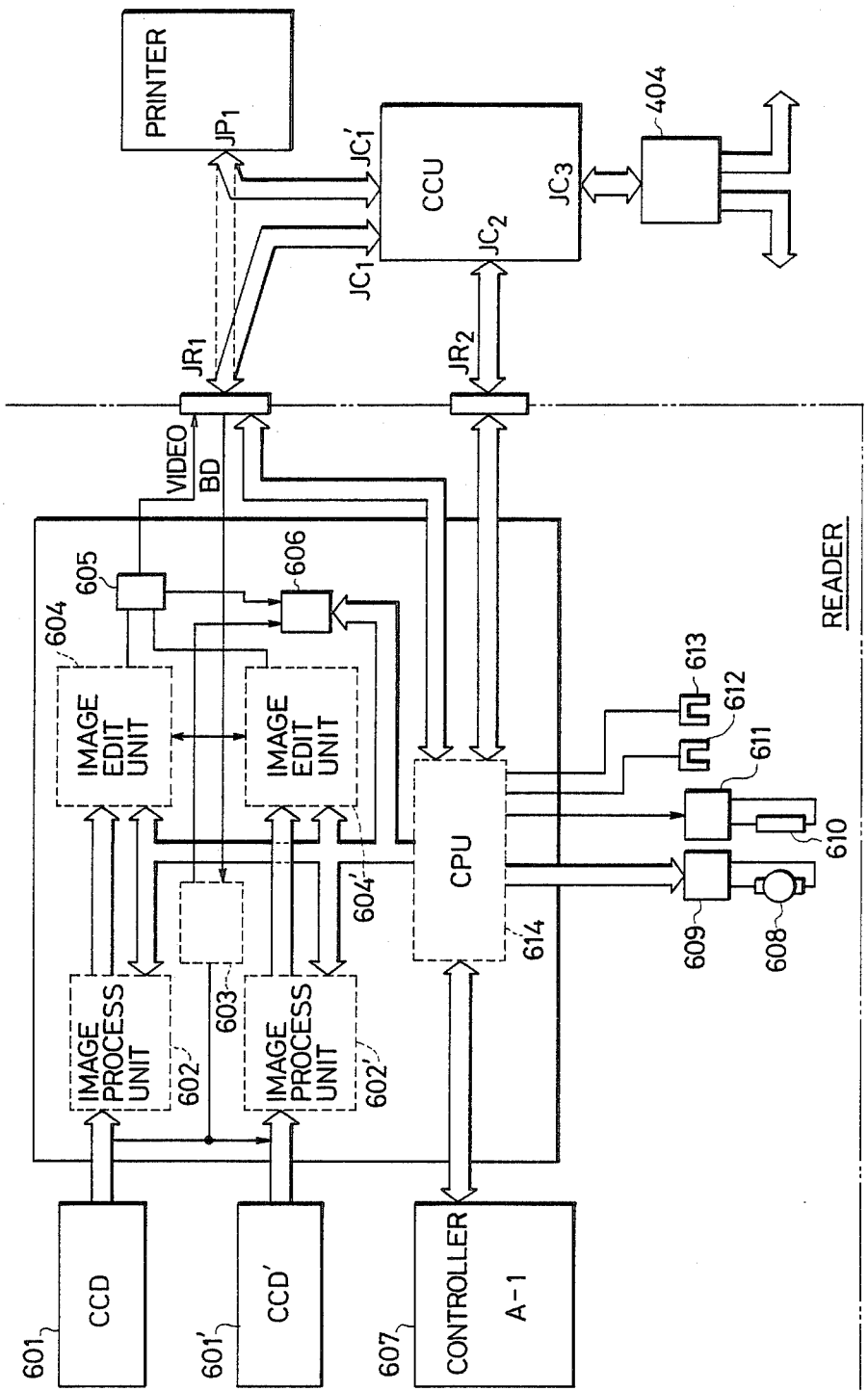
FIG. 4 is a circuit block diagram for the image processing apparatus according to the present invention.

Reverting to FIG. 4 for explaining the system blocks constituting the reader, each of CCD reading units 601 and 601' comprises a CCD, a clock driver therefor, an amplifier for the signals from CCD, and an A/D converter for A/D conversion of the signals. Control signals to the CCD's are generated by CCD control signal generators (only indicated schematically and collectively by box 603) and supplied to clock drivers in the CCD reading units 601, 601', the control signals being generated in synchronism with the horizontal synchronizing signal BD from the printer. The CCD reading units 601, 601' supply image data, which have been converted to 6-bit digital signals, into image processing units 602, 602'.

The image processing unit 602 or 602' comprises a sampling circuit for sampling the output singals of CCD so as to enable a CPU 614 to control the light intensity from the light source; a circuit for detecting the shading caused by the light source and the lens, and a compensation circuit therefor; a peak-hold circuit for detecting the peak light intensity in each main scanning for performing the automatic exposure function; and a quantizing circuit for ternarizing 6-bit image data after completion of the shading compensation, according to slicing levels of the data determined in response to the peak hold value or the dither pattern in the immediately preceding line or in a line before the immediately preceding line. The image signals quantized in the image processing units 602, 602' are supplied to the image editing units 604 and 604'.

Each of the image editing units 604 and 604' comprises a buffer memory of 2 lines, in which each line has a capacity larger by twice or more than 4752 pixels per line. Such large capacity is necessary, because the amount of data signals is doubled when the image signals are stored in the memory with a doubled sampling rate for achieving an image size varying ratio of 200%. Also, two line buffer memories are provided in order to write the image signals of an N'th line into the first memory, while the image signals of an (N-1)'th line are read from the second memory, since both write-in and read-out operations cannot be done simultaneously with a single memory. For ternarization, the quantity of information becomes twice as large as the abovementioned. On account of this, the memory unit necessitates eight memory systems, each consisting of 4752×2 bits. At present, the memory element is made up of a unit of 4 K bits and 16 K bits. Therefore, when a memory consisting of a unit of 16 K bits is to be used, eight 16-bit memories (e.g., HM6116, etc.) are necessary. Besides, this portion includes a write address counter for writing the image data into this buffer memory, a read address counter for reading the image data, and an address selector circuit for changing over the address signals from these two address counters. For the abovementioned counter, a parallel load type counter which is capable of presetting an initial value is used, and the initial value is loaded by the CPU into the I/O port. The CPU follows the coordinate information designated at the operating unit, and presets the address value corresponding to the main scanning coordinate in the abovementioned counter, at every time the auxiliary scanning reaches a line corresponding to the trimming coordinate, thereby enabling editing of the image original information. A coordinate region control counter and a gate circuit are provided for enabling the white masking, black masking, white frame trimming, and black frame trimming. A junction detection shift register is provided for automatic connection of the CCD's. The image data from the image editing unit is first output from 604, and then from 604'. A synthesizing section 605 changes over smoothly these outputs and renders them into a single serial image data. A recognition section 606 performs the pre-scanning of the image original during the idling period of the printer, subsequent to turn-on of the copy button, and detects a coordinate where the image original is situated at that time. In this section, there are provided a shift register to detect 8-bit of the continuous white image data, an I/O port, and main and auxiliary scanning counters. The operating unit or controller 607 includes a key matrix, LED, liquid crystal, and a liquid crystal driver. A reference numeral 608 designates an optical system scanning d.c. motor, and a numeral 609 refers to a drive circuit for the electric motor 608. A reference numeral 610 designates an image original illuminating fluorescent lamp, and a numeral 611 refers to a lighting circuit therefor. 612 represents a photo-sensor to detect that the optical unit is at its home position. 613 refers to a photo-sensor to detect that the optical unit is at the position of illuminating the leading edge of the image original. The CPU 614 is constructed with CPU, ROM, RAM, a battery backup circuit, a timer circuit, and an I/O interface. The CPU 614 controls the operating unit 607 to perform sequence control of the reader in accordance with the operating instructions from an operator, and, at the same time, control of the printer with a command signal. In accordance with instructions from the operating unit 607 relative to the image processing, the CPU effects the data setting with respect to various counters in the image processing units 602, 602' and the image editing units 604, 604', either prior to the image original scanning or during the image original scanning. Furthermore, on the basis of the light quantity data from the image processing unit, the CPU performs, prior to the image original scanning, control of the light quantity with respect to the fluorescent lamp lighting device 611, presetting of speed data with respect to the d.c. motor drive circuit 609 in accordance with a magnification instruction, and/or collecting of image connection data from the image editing units 604, 604', thereby calculating the quantity of the image connection.

FIG. 8 is a flow chart for the key control in the operating unit 607 by the CPU 614. When the power source switch of the reader is turned on, the shift memory, RAM, and so forth to be mentioned later are reset, while those data such as "life size", "no editing", "positive", "no transmission" are set in the memory of the liquid crystal display device 202, and, at the same time, those data such as "lower cassette", "letter original", "single sheet" are set in the tight block 100 (standard mode setting). The same holds good when the interruption key 110 and the reset key 301 are turned on. In the next place, the copy key is discriminated (step 3). In the case of negative reply (N), signal reception or non-reception is determined (step 4). If negative (N), the operational sequence goes to the entry routine in the key sections 200, 300 (step 5). After the mode and the data have been set by the key blocks 200, 300, the printer discriminate whether the printing operation is possible, or not (step 6). If possible, the operational sequence proceeds to the copy key routine. When the copy key is turned on, discrimination is made concerning signal transmission or non-transmission (step 8). If negative, a print start signal is output to the CCU (step 9), and, in case of the signal transmission, required data for the signal transmission such as signal transmission address data, etc., are sent to the CCU (step 10). In the signal reception mode, the signal transmission and the printing operation can be inhibited, even when the copy key is turned on, in which case the display of the mode data thus far are saved in an area where the memory is present, and instead the contents of the signal reception are displayed in the display device 202 (step 11). The display is returned by the clear key to the original mode display (step 12). While the copy key is kept open, the entry of the mode and its change by the key blocks 200, 300 are made possible (step 13). Upon termination of the signal reception (step 14), the operational sequence proceeds to the copy key routine at the step 3 to enable the copying operation. In the step 13, when the cancel key 111 is turned on, the operational sequence proceeds to the step 3 after lapse of a predetermined time, and the signal reception is stopped. Incidentally, when the clear key is turned on during the step 13, the data concerning the number of copy are reset and cleared, but the mode data, etc. set by the program keys are not reset. Resetting of the standard mode is effected by the key 301.

Referring now to FIGS. 5 and 7, the sequence control operations is explained. As shown in FIG. 7, there are provided three position sensors 37a, 37b, and 37c on the scanning optical system of the reader. At the left side of the reader, as viewed from the front face of the reader, there is situated an optical system home position sensor 37a (producing an output signal OHP). The optical system is usually stopped at this position. When the reader is driven, the optical system commences its scanning operation from left to right. The image leading edge sensor 37b is disposed just at a location corresponding to the reference position of the image. Upon detection by this sensor 37b of the image leading edge, the control circuit produces an image data signal output (VIDEO CLK), and, at the same time, generates a signal indicating the data effective period (VIDEO ENABLE) in each main scanning cycle (347.2 $\mu$S). The control circuit, then, commences counting of the number of this VIDEO ENABLE signal by the abovementioned sensor 37b, and, when the counting has reached a value $a$ corresponding to the first point, second point, and the third point in accordance with the cassette size or the magnification variation in the printer, interrupts the optical system advance drive signal, and changes it over to the reverse drive signal. The sensor 37c (PRINT START sensor) is provided on the way of the return path of the optical system. After the reverse driving, when the optical system causes this sensor 37c to actuate, the control circuit determines whether the optical system has scanned the image original for the designated number of copy sheet, or not. If the number of the scanning operation does not coincide with the designated number of copy sheet, it generates the PRINT START signal in the printer for giving the subsequent paper feeding instruction. Incidentally, it should be noted that the position of the sensor 37c is so adjusted that the timing $T_2$ in FIG. 7 may be made equal to the timing $T_1$.

In the following, explanations will be made in reference to FIG. 9-1 as to the processing of signals from the CCD. An output analog signal of 2592 bits from the CCD is amplified in an amplifier AMP 901, and subjected to A/D conversion in an A/D converter 902 to be a digital signal. On the other hand, a reference white plate is illuminated before start of the copying operation, and the digital data thereof are once written in RAM 904. Upon start of the copying, the data in the RAM 904 and the current image data are multiplied to thereby correct the shading. The image data to be output from a multiple ROM 905 are digital signals containing no shading (this is realized by an output to be obtained by entering the multiple data in the ROM 905-1 in the form a table, and then addressing them with the image data).

The dither ROM 907 for expressing half tone is so set that, as shown in FIG. 10, "same weight code" (6 bits) may be output with a 4-bit interval in the main scanning direction and with a 4-bit interval in the auxiliary scanning direction. In this matrix of 4×4=16 bits, 16 kinds of the weight codes are allotted.

FIG. 10 indicates the data of the dither ROM, wherein "A" denotes examples of the output values from ROM's 907-1A, 907-2A, and "B" denotes examples of the output values from ROM's 907-1B, 907-2B. The arrangements of "A" and "B" are mutually different with a predetermined relationship. Accordingly, by addressing these dither ROM's 907 with the 2-bit main scanning counter 908 (e.g., SN74 LS161, etc.) and the 2-bit auxiliary scanning counter, there can be obtained "different weight code" output.

There are a plurality of sets in the combination of the weight codes as established in this 4×4 matrix, and, depending on the combination, reproducibility of the half tone image can be varied. Selection in this combination is effected by the I/O latch 910, and presetting of the combination into this latch is done by the CPU 614 shown in FIG. 4. In more detail, when it is desired to decrease or increase the image density, the operator executes such an instruction by moving the density adjusting lever 104 in the operating unit, whereupon the CPU sets a preset value corresponding to the value indicated by the density adjusting lever in the I/O latch 910. Since the dither ROM 907 has a plurality of dither patterns to enable light and shade in the image to be varied, based on the established data, there can be obtained an image with such established density.

Incidentally, the comparator 906 for the binarization has a plurality of systems (i.e., "A" system and "B" system) so as to be able to compare one picture element with the threshold of two values from the two ROM's simultaneously. This realizes the ternarization of an image. That is to say, by the simultaneous binarization of one image element with different thresholds of the dither ROM 907-1A and 907-1B (or 907-2A and 907-2B), there can be reproduced three kinds of density conditions (to be called hereinafter "ternary value"), as follows: (i) both A and B are in the relationship of image data > ROM data; (ii) either A or B is in the relationship of image data > ROM data; and (iii) both A and B are in the relationship of image data ≦ ROM data. Then, the parallel 2-bit image signals are introduced as inputs into the shift memories 57-1(A), 57-1(B) in FIG. 11, and processed therein in parallel. When the processed signals are output to the printer, they are divided into the first half and the second half of a single image element, subjected to the pulse width modulation, and output to the printer. The laser beam in the printer is modulated in beam width by this pulse width modulated output to be in an elliptic form. As the consequence of this, there can be realized in the 16 picture elements the density containing 32 gradations. With such arrangement, it becomes possible to realize a variety of gradations in a small pattern, so that the reproducibility of the half tone can be improved without deteriorating so much the reproducibility of letters and characters. The same can be said of multi-value dither such as ternary dither, or higher.

Also, since the dither ROM's 907-1A and 907-1B are both driven in parallel, the addressing speed of the ROM need not be increased, hence the image reproduction can be done at the conventional processing speed.

Incidentally, the image region can be designated with the program keys and the ten numeric keys shown in FIG. 3, which makes it possible to reproduce only the necessary portion in the image original with the output of the abovementioned ternary dither, and to reproduce the remaining portion thereof through a single dither ROM or with a simple binary without passing through the dither ROM.

That is, when the ternary dither processing is to be effected only within a region as designated by the key, each element of the matrix produces the output patterns of the same level in the I/O latch 910 by the CPU, until the main and auxiliary scanning counters reach the coordinate corresponding to the region, while it executes the simple binarizing process outside that region. When the CPU determines that the counters reach the coordinate, it produces a predetermined arranging pattern to the latch 910 and executes the ternary dither processing. In this manner, the resolution of the characters, etc., can be remarkably increased outside the region, while the gradation can be enhanced within the designated resion. Incidentally, by automatic recognition of the character region, the abovementioned processing can be differentiated.

Figure 11:
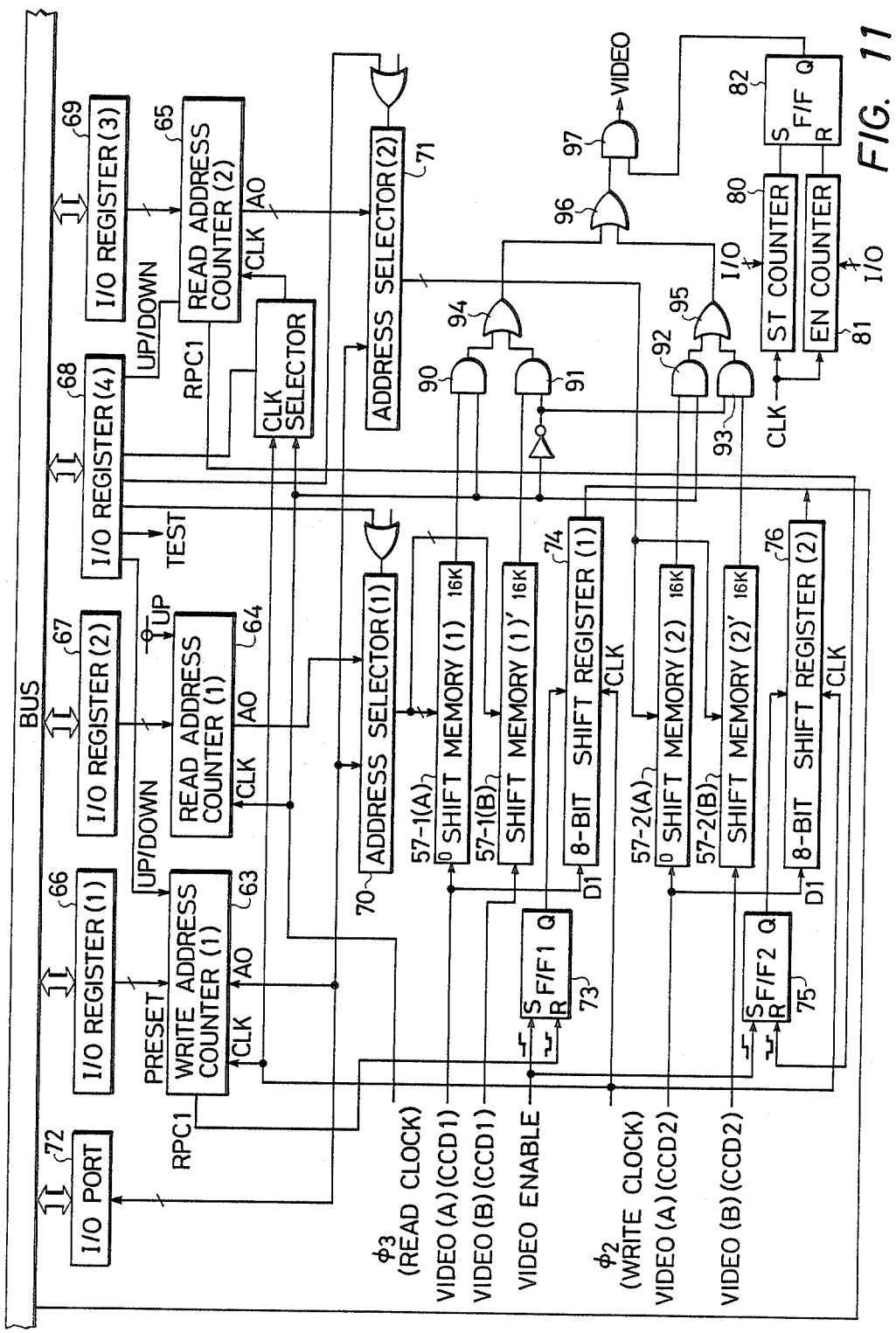
FIG. 11 is a circuit diagram of the image processing unit.

In the image processing unit shown in FIG. 11, the outputs from the shift memories (1), (1)' (indicated by reference characters 57-1(A) and 57-1(B), respectively) are produced simultaneously. In case the outputs from both memories (1), (1)' assume the level "1", the OR gate 94 is converted by the AND gates 90, 91 so that it may output a width "1"; in case the output from either one of the memories (1), (1)' assumes the level "1", it may output a width "0.5"; and, in case the output from both memories (1), (1)' assume the level "0", it may output width "0". The same can be said of the shift memories (2), (2)' (indicated by reference characters 57-2(A) and 57-2(B), respectively). Also, the corresponding measures can be taken, even if a plurality of CCD's are connected by means of the OR gate 96.

Each shift memory is controlled for its writein and read-out operations by the write address counter 63 and the read address counters 64, 65 due to presetting of the data in the registers 66 to 69 through the address selectors (1), (2) (indicated by reference characters 70 and 71, respectively). The presetting of the data into the registers by the CPU makes it possible to determine and change the timing for writing into the memory or reading out of the memory. In order to enable such change to be effected, the memory has a capacity for two lines in the CCD. Accordingly, the print position can be changed by setting the data in the register through the key, hence the multivalue dither outputs can be edited.

The masking and trimming operations can be effected by feeding a part of the output from this OR gate 96 to the AND gate 97 in the subsequent stage. This can be done by controlling the gate 97 with a desired timing based on the outputs from the counters 80, 81 which count the picture element, and the flip-flop 82.

FIG. 9-2 is a schematic block diagram of a circuit constructed by substituting the RAM's 907-1A', 907-1B', 907-2A', and 907-2B' for the dither ROM's 907-1A, 907-1B, 907-2A, and 907-2B in FIG. 9-1. The dither RAM, same as the abovementioned dither ROM, is constructed with 4×4 matrix, into which the pattern as shown in FIG. 10 is stored. The weight codes to be set in the 4×4 matrix of the RAM are preset by the CPU. That is to say, arbitrary data are written in the dither RAM's 907 by turning the selectors 912-1A' to 912-2B' to the side of the address bus and by closing the data bus switches 913-1A to 913-2B. When the image processing is effected, the data bus switches 913 are opened and the selectors 912 are turned to the side of the dither RAM counters 908, 909, whereby the dither processing can be done in accordance with the data as written in the RAM. In more detail, basic patterns (such as, for example, Bayer pattern, spiral pattern, etc.) of the dither matrix are stored in advance in the ROM section (not shown) of the CPU, and the modified data of the basic patterns are stored in the RAM with the values set by the density adjusting lever 104. That is, using an equation such as $Y=e^x$, etc., it is possible to freely prepare data from the modified data of the basic patterns, showing enhanced gradation in the black portion of the image, or enhanced gradation in the white portion of the image. In other words, the RAM's are made accessible by the address data in the CPU through the selectors 912, while the pattern data are stored in the RAM's by way of the switches 913. On the other hand, at the time of the half tone expression process, the RAM is made accessible by the picture element address, and an output signal B is produced from the RAM by the address data.

The pattern data of the dither ROM can also be preset by the ten numeric keys shown in FIG. 3, whereby desired half tone reproduction characteristic can be obtained. It is further possible that the image original is pre-scanned, and, based on the image information obtained from the pre-scanning, a dither pattern for eliminating the background is automatically determined to thereby store the corresponding data in the RAM. In this manner, there can be realized adequate half tone reproduction in conformity to the image original.

CCD Junction Correction

A method for automatically jointing two CCD's in the main scanning direction will now be explained.

Referring to FIGS. 2 and 7, a white plate is arranged to cover the main scanning width on the home position (above the switch 37a) of the reader (the optical system). When the optical system is at its ordinary home position and the light source is turned on, the white plate is illuminated, and the light reflected by the white plate is introduced as an input into the CCD. Thus, when the optical system is at the home position, the control circuit corrects fluctuations in the light intensity and fluctuations in the sensitivity of the two CCD's (shading correction).

A black thin line B1 of 2 mm in width extends in the sub-scanning direction at the center of the white plate for the purpose of junction correction. The thin line may be of any width which is an integral multiple of the quantization. When the optical system is at the home position and the light source is turned on, this black thin line appears on the bits near the edges of each of the two CCD's. The resulting CCD signals are supplied to the shift memories, and the lower 128 bits of the CCD1 signals are compared with the higher 128 bits of the CCD2 signals. It is then verified that each of the 128-bit data have, without exception, white bits appearing in the beginning and the end, with black bits being held therebetween. The number of bits equal to the sum of the number of lower white bits in the CCD1 signals and the number of higher white bits and black bits in the CCD2 signals is eliminated when the signals are read out of the CCD2 shift memory. In FIG. 126, arrows "CCD" indicate the main scanning direction, and in FIG. 2, an arrow "SUB-SCAN DIRECTION" indicates the sub-scanning direction.

Figure 12A:
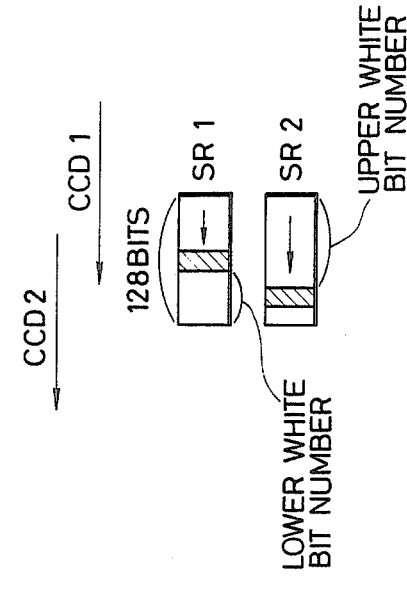
Figure 12B:
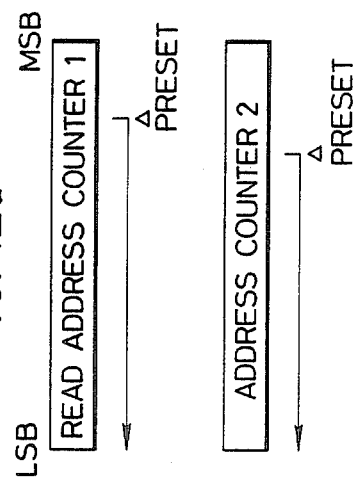

FIG. 11 illustrates a specific method. In order to write the image signals into the shift memories 57-1, 57-2 composed of static RAM's, there are provided a write address counter 63 and read address counters 64, 65. The quantity of information supplied to the memories from the CCD's changes in accordance with the image magnification ratio. In the present embodiment, therefore, the write address counter (1) for the CCD1 is caused to count with the input clock signals $\phi2$ which are introduced by the count-up mode from the least significant bit, then the number of pixels is counted by the CCD scanning, and the final count is verified and stored in the RAM of the CPU. When the image magnification ratio is equal to life, the final count should be 2592. In order to extract the lower 8 bits of the CCD1 signals (first bit which appears in the main scanning being the most significant bit) and the higher 8 bits of the CCD2 signals, the aforementioned verified count value is set in the write address counter 63 for the CCD1, while 08H (H indicating a hexadecimal code) is set in the address counter 65 for the CCD2, and a count-down mode is designated. On the other hand, 8-bit shift registers for receiving the image signals from the respective CCD's are provided. The shift registers are driven for a period starting from the rise of the VIDEO ENABLE signal, representing the main scanning period of the CCD's, to a ripple carry of the counter (which is driven by the clock signals generated during the VIDEO ENABLE period). Thus, the lowest 8 bits of the CCD1 image signals remain in the CCD1 shift register and the highest 8 bits of the CCD2 image signals remain in the CCD2 shift register, after the first scanning. The contents remaining in the shift registers are read by the CPU 36 and stored in the RAM. Then, in order to extract the lower 9th to 16th bits of the CCD1 signals and higher 9th to 16th bits of the CCD2 signals, the aforementioned verified count value 8 is set in the write address counter 63 for the CCD1, while 10H is set in the address counter 65 for the CCD2. Thereafter, the read-out operation is performed in the same manner as mentioned above. The above-mentioned operations are repeated for each of sixteen scannings to develop the higher 128 bits of the CCD1 signals and the lower 128 bits of the CCD2 signals in the memories. Then, the number of black bits, the number of lower white bits of the CCD1 signals, and the number of higher white bits of the CCD2 signals are calculated. The number of junction bits, or the number of bits equal to the sum of the number of lower white bits of the CCD1, the number of higher white bits and black bits of the CCD2 is eliminated when the image signals are read from the CCD2 shift memory. In this manner the jointing in the main scanning direction is attained (cf. FIGS. 12a and 12b).

Figure 12C:
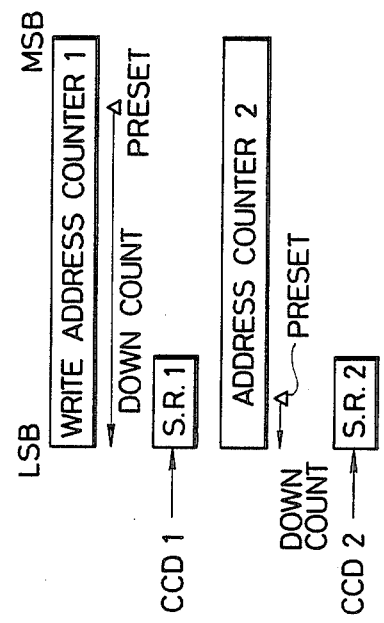

The function of the shift memories after establishment of the jointing logic will now be explained. When the image signals are to be written into the shift memories, the aforementioned count values are preset in the CCD1 and CCD2 write address counters 63, and then the shift memories are addressed by counting down the address counter, thereby writing the image data. This procedure is shown in FIG. 12c.

Figure 12D:
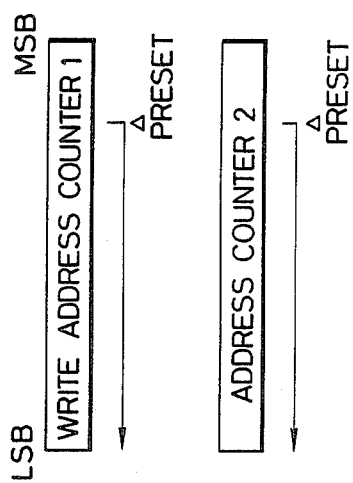

What is to be first considered at the image signal read-out from the shift memories is the standard for the main scanning direction on the original. Since a standard position SP for placing the image original is at 148.5 mm of the center of the black thin line (1.5 mm in width) for CCD jointing, the start address A1 for reading the CCD1 shift memory is given by {(the number of lower white bits)+(the number of black bits /2)+(148.5×16)}×image magnification ratio. The start address for reading the CCD2 shift memory is given by {(the final verified count value)−(the number of junction bits)}×image magnification ratio. The CCD1 read address counter (1) is counted down by 4752 read clock pulse signals $\phi3$ of 13.89 MHz. When a ripple carry is produced at zero count, the CCD2 address counter (2) is counted down to read out the image signals from the shift memory. This procedure is shown in FIG. 12d. In this manner, continuous image signals (video signals) for one line are transmitted to the printer. In this case, writing to and reading from the memory can be continuously made by writing signals of a next line into the memories 57-3 and 57-4, while the signals are being read from the memories 57-1 and 57-2, and further writing signals of a next line to the memories 57-1 and 57-2, while the signals are being read from the memories 57-3 and 57-4.

FIG. 11 shows a circuit relating to the above-described shift memories, wherein are shown a static shift memory (1) for storing the CCD1 image signals; a static shift memory (2) for storing the CCD2 image signals; a write address counter 63 for writing signals into the shift memories (1) and (2); a read address counter (1) for reading signals from the shift memory (1); an address counter (2) for reading signals from the shift memory (2); an address selector (1) for selecting either the address signal from the write address counter 63 or the address signal from the read address counter (1) to make address in the shift memory (1); an address selector (2) for selecting either the address signal from the write address counter 63 or the address signal of the address counter (2) to make address in the shift memory (2); a shift register 74 for taking out the CCD1 image signals, for 8 bits at a time, starting from the least significant bit; a shift register 76 for taking out the CCD2 image signals, for 8 bits at a time, starting from the most significant bit; a flip-flop 73 to be set by the rise of the video enable signal, reset by the ripple carry of the Z0 write address counter 63, and used for controlling the input period of the signal into the shift register 74; a flip-flop 75 to be set by the rise of the video enable signal, reset by the ripple carry of the read address counter (2), and used for controlling the input period of the signal into the shift register 76; an I/O port 72 for conveying to the CPU the count of the write address counter 63 after it has been counted up; I/O registers 66, 67 and 69 for supplying preset counts from the CPU to the write address counter 63 and the read address counters 64, 65 respectively; an I/O register 68 for designating either the count-up mode or the count-down mode to the write address counter 63 and the address counter 65, for designating any one of the selected output counts to the address selectors 70 and 71, for determining whether the address counter (2), is driven with the write or read clock signals, and for supplying the CPU with a signal TEST for jointing, in response to which the CPU drives the CCD's, while the optical system is stopped, thus supplying image signals for one line to the shift memories through the CCD driver circuit 33.

Now reference is made to the circuit diagram shown in FIG. 11 for explaining the operations of extracting the CCD1 image signals, 8 bits each at a time, starting from the least significant bit and extracting the CCD2 image signals, 8 bits each at a time, starting from the most significant bit, thereby extracting 128 bits for jointing the images.

[1] At first, the CPU sets the write address counter 63 to the count-up mode, and sets "0" in the I/O register (1).

[2] A single pulse is given as the signal TEST (corresponding to the machine start) to the I/O register (4), whereby a single VIDEO ENABLE signal and clock signals $\phi 2$ are generated from a CCD driver in accordance with the image magnification ratio to supply the image signals to the shift memory.

[3] The CPU takes thereinto the content of the write address counter 63 through the I/O port.

[4] The write address counter 63 is set to the count-down mode, the address counter (2) is set to the count-down mode, the count value stored in the step [3] is preset in the I/O register (1), and 7H is preset in the I/O register (3).

[5] A signal TEST pulse is generated, and, when the signal VIDEO ENABLE is terminated, the 8 bits are taken out of the shift registers 74 and 76 in succession and stored in the memory.

[6] The count value 7H stored in the step [3] is set in the I/O register (1) and 10H is set in the I/O register (2).

[7] The step [5] is repeated.

[8] The count value 77H stored in the step [3] is set in the I/O register (1), 7FH is set in the I/O register (2), and a signal TEST is generated to read the contents of the shift registers 74, 76.

The above-described junction correction procedure is described in detail in Japanese Patent Application No. 128073/1982 filed on behalf of the assignee of the present application.

In this manner, the jointing of the picture elements in the main scanning direction can be realized. However, since the dither pattern is repeated in a 4-bit unit, the repeating pattern would inevitably be disturbed at the junction between CCD1 and CCD2 images with such dither pattern, and the gradation of the reproduced image becomes unnatural.

A solution to this problem will be explained hereinbelow in reference to FIGS. 9-1 and 9-2. In the drawing, a main scanning counter 908 (e.g., SN74, LS161, etc.) to drive the dither ROM or RAM is operated with a video signal CLK (write clock signal $\phi 2$) to load an initial value with a horizontal synchronous signal (H.SYNC) corresponding to a beam detection signal which indicates commencement of one scan line of the laser beam. The main scanning counter 908-1 which takes care of the CCD1 system imposes a load level "0" at the H.SYNC to start its counting operation, and repeats the counting operations as "0", "1", "2", "3", "0", "1", "2", . . . . On the contrary, the main scanning counter 908-2 which takes care of the CCD2 system, while it also commences its counting operation with the horizontal synchronous signal H.SYNC, is controlled by the CPU for its count start value, i.e., the initial value to be loaded on the counter with the signal H.SYNC. That is, to say, after completion of the automatic jointing as mentioned in the foregoing, the CPU sets the data in the I/O latch 911 so that the load value of the main scanning counter 908-2 may be "0", when the bit number used in the CCD1 system is just a multiple of 4; the load value thereof be "1" when the bit number is (multiple of 4+1); it be "2" when the bit number is (multiple of 4+2); and it be "3" when the bit number is (multiple of 4+3). In this manner, the disturbance in the dither pattern in the vicinity of the junction between CCD1 and CCD2, and an image of a smooth gradation can be eliminated. This means that the dither pattern connection has been attained.

In the same manner, the dither connection at the time of varying the magnification can also be effected by adding or subtracting the bit number used in the CCD1 system to and from the multiple of 4 by a few bits. The magnification variation in the main scanning direction can be achieved by varying the write clock signal $\phi 1$ obtained by frequency-division of the CCD clock signal $\phi 1$ in accordance with the magnifying ratio. The magnification variation in the auxiliary scanning direction can be effected by varying the moving speed of the optical system in accordance with the magnifying ratio.

In the foregoing, explanations have been made in reference to the dither matrix of 4×4 bits. It should, however, be noted that the dither pattern connection can also be effected on the basis of the matrix of 2×2 bits, 8×8 bits, and so forth.

What I claim is:

1. An image processing system comprising:
designation means for designating a plurality of areas of an original to be separately processed;
reading means for reading the original and outputting a first electric signal representative of the original;
process means for image-processing the electric signal for each of the areas designated by said designation means, wherein said process means comprises first processing means resposnive to a level of the first electrical signal for controlling a recording signal to produce a first resultant signal having three or more levels in pulse width, and second processing means responsive to a level of the first electrical signal for controlling the recording signal to produce a second resultant signal having two levels in pulse width; and
record mean for recording an image on a recording member in response to the first and second resultant signals from said respective first and second processing means.

2. An image processing system according to claim 1, wherein said second processing means controls the recording signal to produce a second resultant signal having a zero and a predetermined non-zero level in pulse width.

3. An image processing system according to claim 1, wherein said first processing means controls the recording signal to produce a first resultant signal having a relative levels of 0, ½ and 1 in pulse width when the level of the second resultant signal is said predetermined non-zero level in pulse width.

4. An image processing system according to claim 1, wherein said recording means is a laser printer which records an image on a photosensitive member by means of a laser beam.

5. An image processing system according to claim 1, wherein said first processing means comprises a plurality of dither process circuits.

6. An image processing system according to claim 5, wherein said dither process circuits each have a changeable threshold pattern.

7. An image processing apparatus comprising:
reading means having a plurality of reading units for reading an original to produce an electric signal, said reading units each having a plurality of photosensitive elements and being arranged along a main scanning direction;
discrimination means for discriminating a junction between two of said reading units;

dither process means including a plurality of dither process units corresponding respectively to said reading units, each said dither process unit having a dither matrix and dither-processing an image signal from one of said reading units; and means for connecting the dither matrices of said plurality of dither process units to establish continuity of dither processing at the junction.

8. An image processing apparatus according to claim 7, wherein said discrimination means includes detection means for detecting a quantity of the electric signal which corresponds to the junction and contains overlapping information from said reading units immediately to either side of the junction.

9. An image processing apparatus according to claim 8, wherein said detection means detects the quantity by reading a predetermined pattern at the junction.

10. An image processing apparatus comprising:

reading means for reading an original image for each scanning line;

converter means, comprising a plurality of dither process means, for converting a signal from said reading means into a digital signal so as to have a plurality of bits for each picture element;

memory means for storing the digital signal from said converter means;

writing means for writing in parallel the plurality of bits of the digital signal in said memory means; and reading means for reading out in parallel the plurality of bits of the digital signal from said memory means, wherein said reading means forms recording signals having respective different pulse widths corresponding respectively to said plural dither process means.

11. An image processing apparatus according to claim 10, further comprising record means for recording the binary recording signal.

12. An image processing system according to claim 11, wherein said recording means is a laser printer which records an image on a photosensitive member by means of a laser beam.

* * * * *

UNITED STATES PATENT AND TRADEMARK OFFICE
CERTIFICATE OF CORRECTION

PATENT NO. : 4,734,782
DATED : March 29, 1988
INVENTOR(S) : KATSUYOSHI MAESHIMA

Page 1 of 4

It is certified that error appears in the above-identified patent and that said Letters Patent is hereby corrected as shown below:

AT [56] IN REFERENCES CITED

U.S. Patent Documents, "Gjiri et al." should read --Ejiri et al.--.
U.S. Patent Documents, "Sekejawa" should read --Sekigawa--.

AT [57] IN THE ABSTRACT

Line 5, "half a" should read --a half--.

COLUMN 1

Line 31, "as photograph" should read --as a photograph--.
Line 59, "CCD" should read --CCD's--.

COLUMN 2

Line 20, "waste" should read --and waste--.

COLUMN 3

Line 23, "drawing" should read --drawings--.
Line 44, "FIGS. 112a," should read --FIGS. 12a,--.
Line 53, "separated each" should read --separated from each--.
Line 55, "reader B" should read --reader A--.
Line 59, "reader B." should read --printer B.--.

UNITED STATES PATENT AND TRADEMARK OFFICE
CERTIFICATE OF CORRECTION

PATENT NO. : 4,734,782
DATED : March 29, 1988
INVENTOR(S) : KATSUYOSHI MAESHIMA

It is certified that error appears in the above-identified patent and that said Letters Patent is hereby corrected as shown below:

COLUMN 5

Line 19, "perfor-" should read --function--.
    Line 20, "mance" should be deleted.
    Line 58, "photograph." should read --a photograph.--.
    Line 61, "following" should read --the following--.

COLUMN 7

Line 49, "acutation" should read --actuation--.

COLUMN 10

Line 43, "tight" should read --right--.
    Line 52, "discriminate" should read --discriminates--.

COLUMN 11

Line 14, "operations" should read --operation--.
    Line 65, "form a" should read --form of a--.

COLUMN 13

Line 19, "resion." should read --region.--.
    Line 37, "writein" should read --write-in--.

COLUMN 14

Line 63, "FIG. 126," should read --GIF. 12b,--.

UNITED STATES PATENT AND TRADEMARK OFFICE
CERTIFICATE OF CORRECTION

PATENT NO. : 4,734,782
DATED : March 29, 1988
INVENTOR(S) : KATSUYOSHI MAESHIMA

It is certified that error appears in the above-identified patent and that said Letters Patent is hereby corrected as shown below:

COLUMN 15

Line 32, "CPU 36" should read --CPU--.

COLUMN 16

Line 39, "Z0" should be deleted.

COLUMN 17

Line 24, "77H" should read --7H--.
Line 57, "is," should read --is--.
Line 63, "be" should read --may be--.
Line 64, "be" should read --may be--.
Line 65, "be" should read --may be--.

COLUMN 18

Line 28, "resposnive" should read --responsive--.
Line 36, "mean" should read --means--.
Line 47, "a" (second occurrence) should be deleted.

UNITED STATES PATENT AND TRADEMARK OFFICE
CERTIFICATE OF CORRECTION

PATENT NO. : 4,734,782
DATED : March 29, 1988
INVENTOR(S) : KATSUYOSHI MAESHIMA

It is certified that error appears in the above-identified patent and that said Letters Patent is hereby corrected as shown below:

COLUMN 20

Line 16, "binary" should read --digital--.

Signed and Sealed this

Ninth Day of May, 1989

Attest:

DONALD J. QUIGG

Attesting Officer

Commissioner of Patents and Trademarks